Sept. 4, 1923.
W. J. FITZGERALD
ROAD MAKING MACHINE
Filed Aug. 30, 1920
1,467,243
6 Sheets-Sheet 1
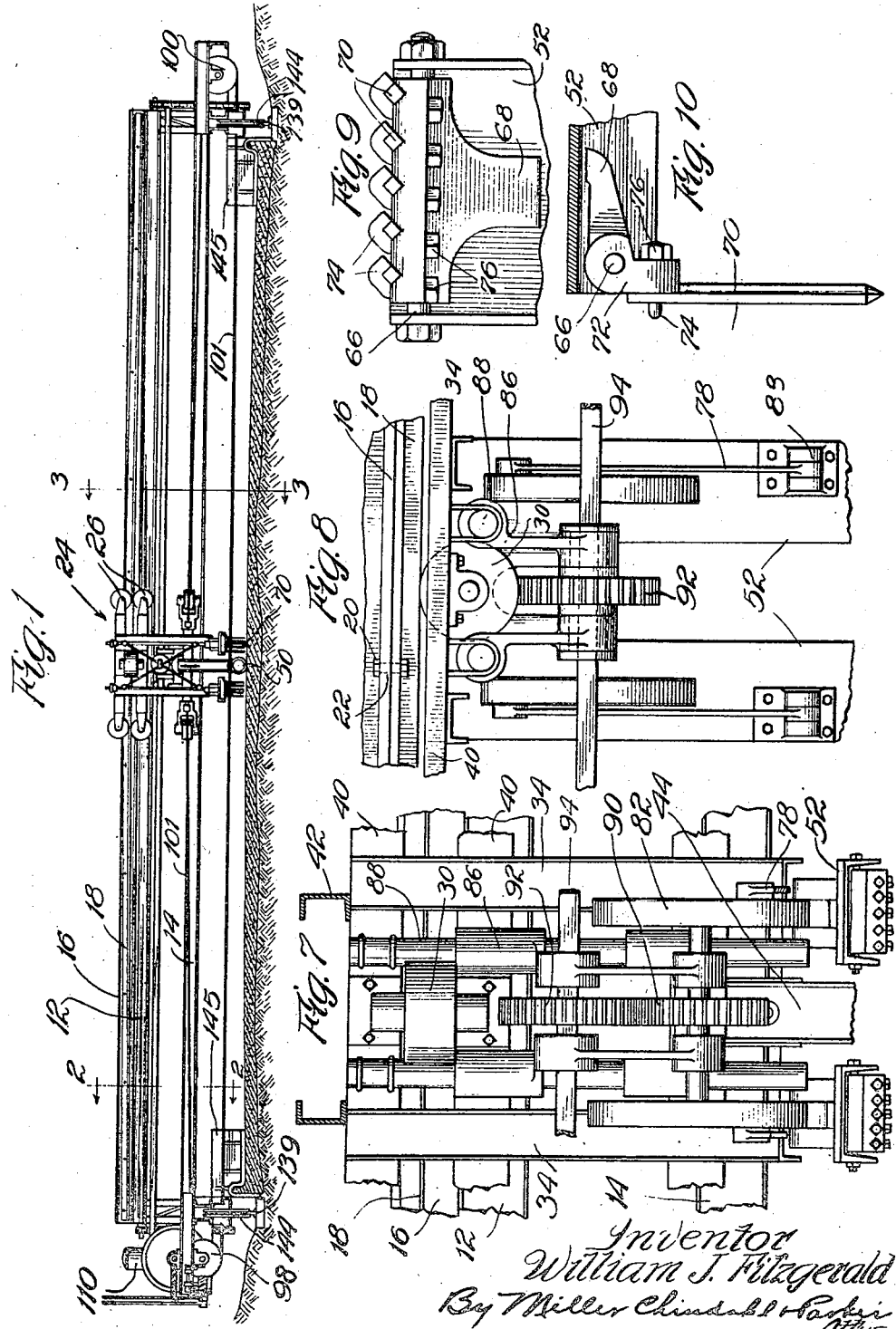

Sept. 4, 1923.                     W. J. FITZGERALD                     1,467,243
                                   ROAD MAKING MACHINE
                                   Filed Aug. 30, 1920              6 Sheets-Sheet 2
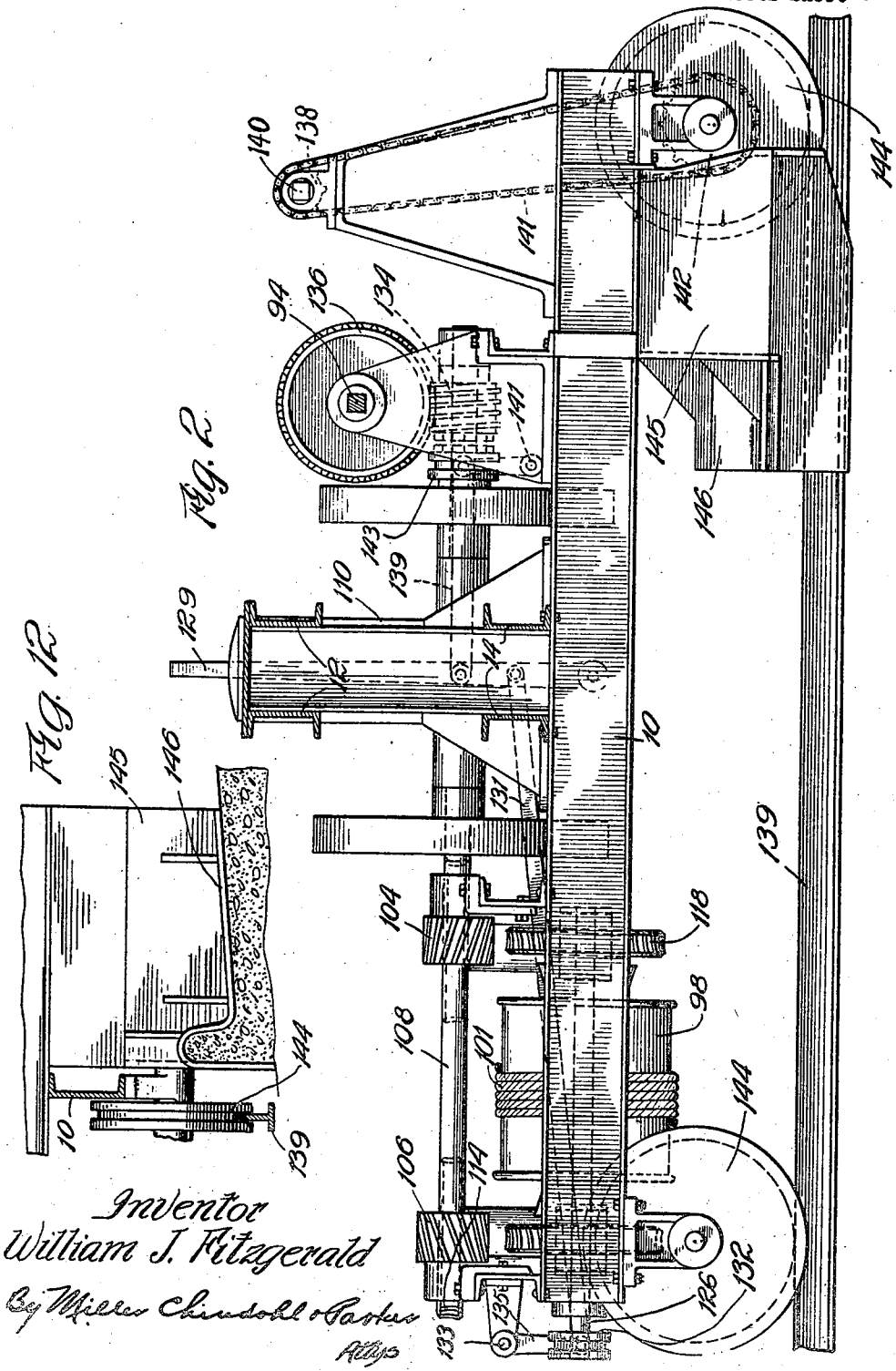
Inventor
William J. Fitzgerald
By Miller Chindoll & Parker
        Attys

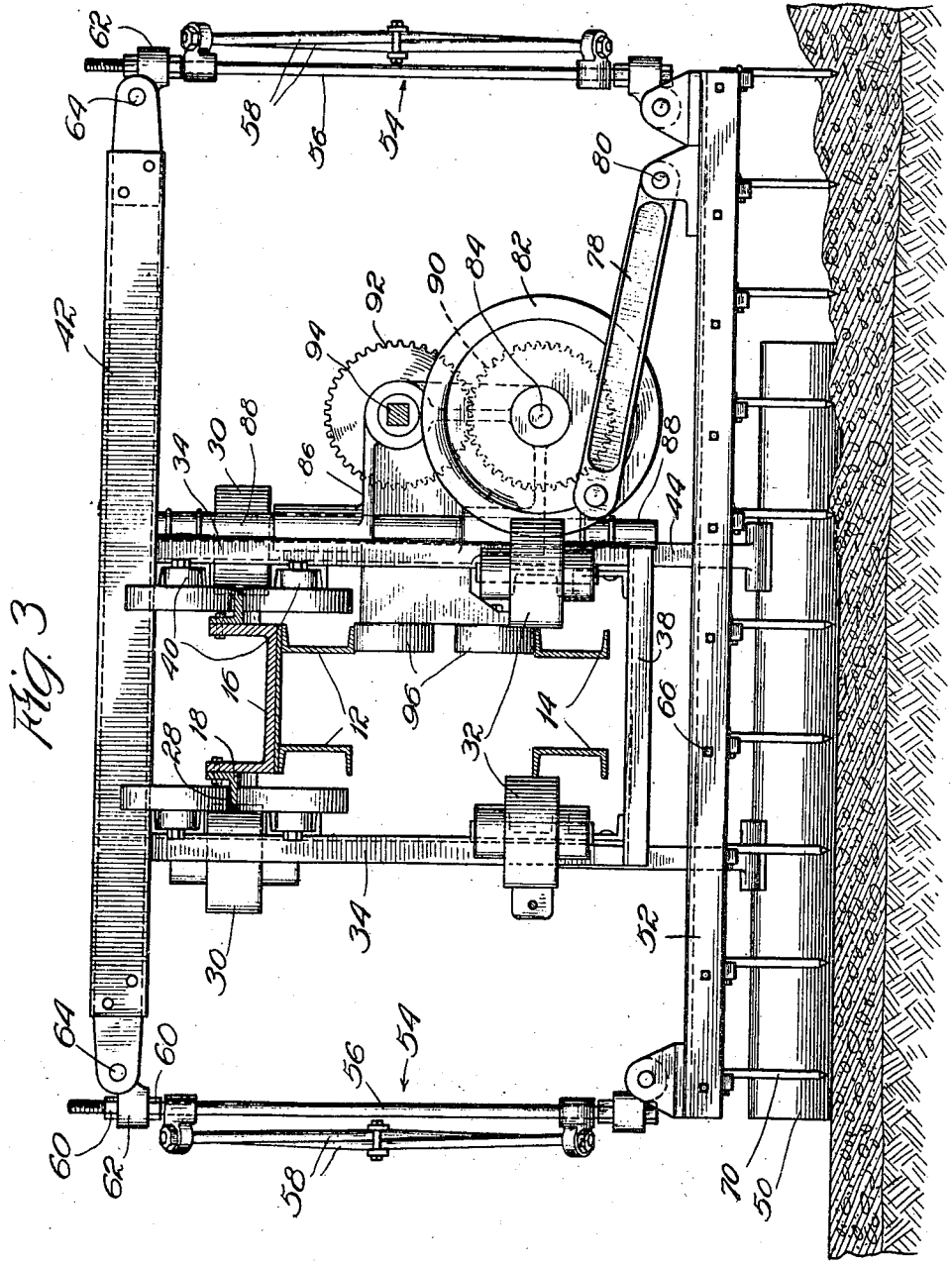

Sept. 4, 1923.
W. J. FITZGERALD
1,467,243
ROAD MAKING MACHINE
Filed Aug. 30, 1920
6 Sheets-Sheet 4
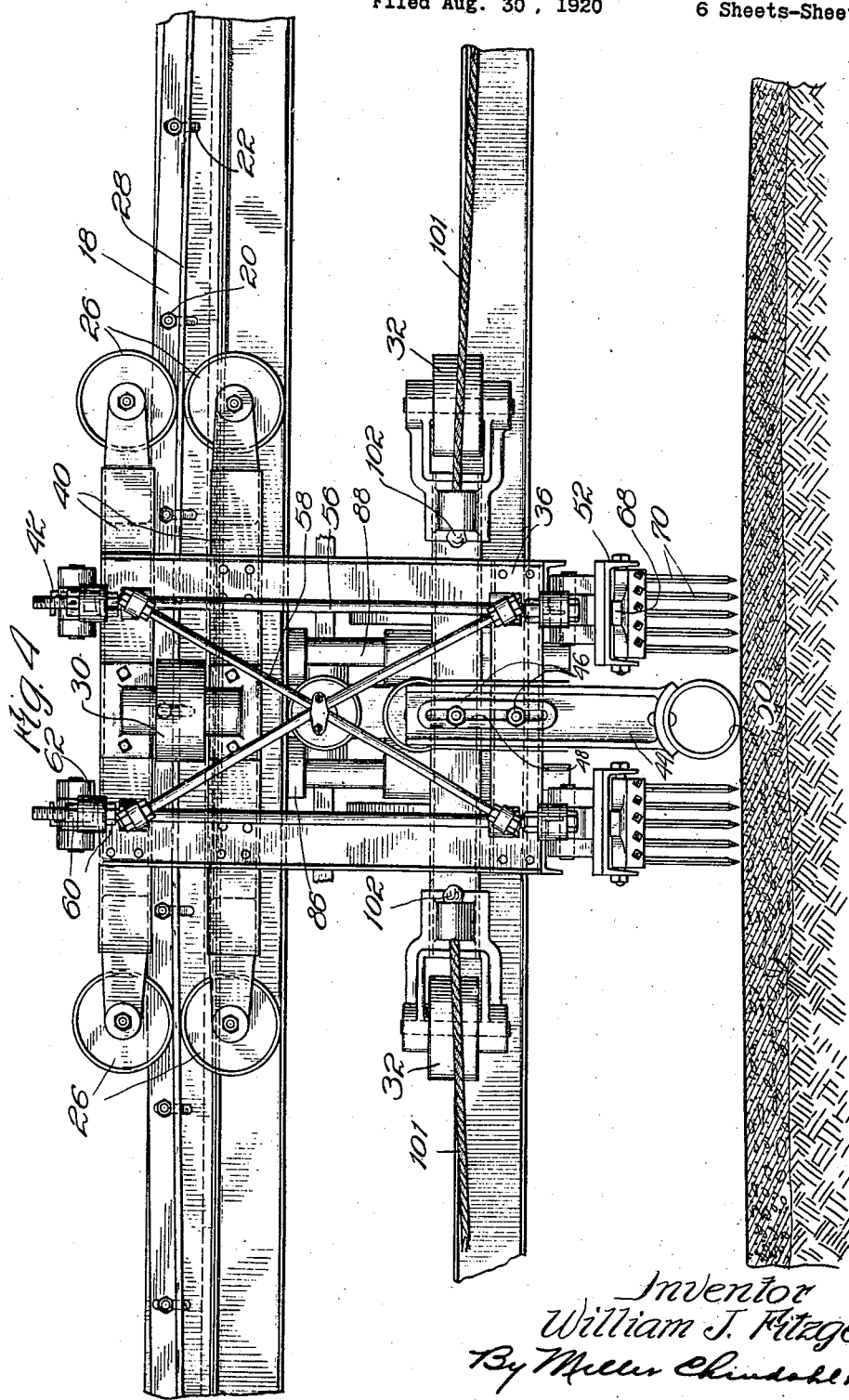
Inventor
William J. Fitzgerald
By Miller Chindahl & Parker
Attys

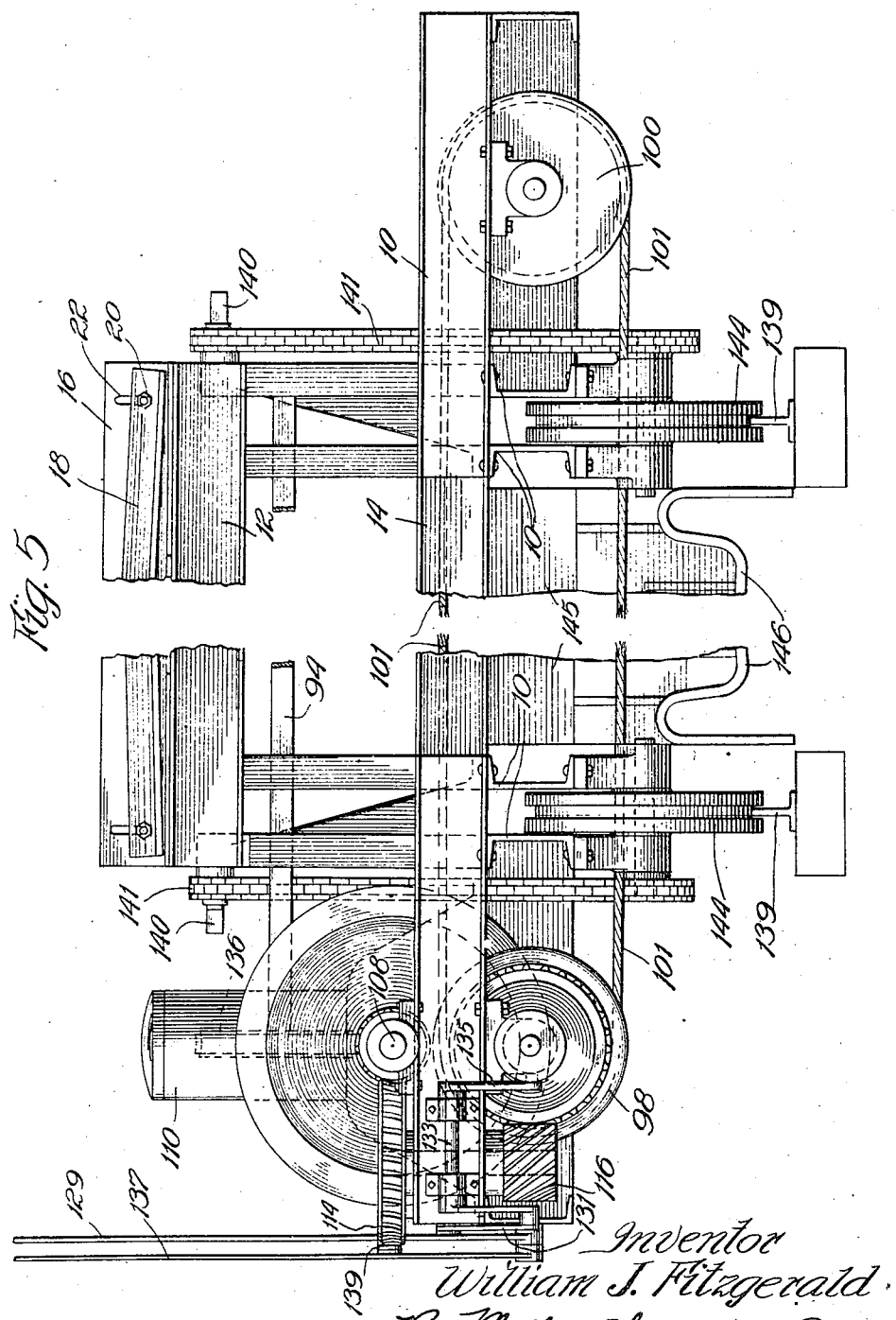

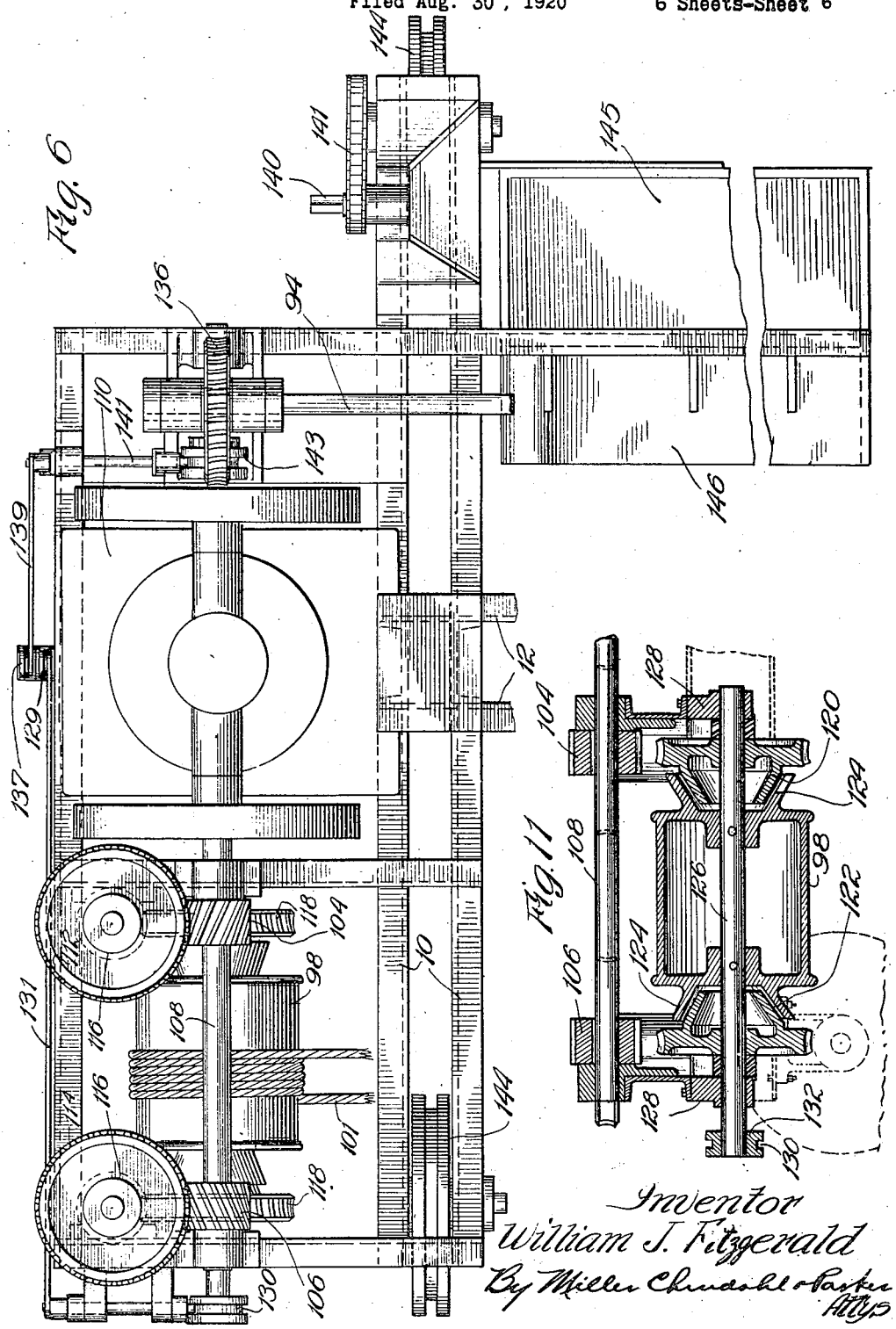

Patented Sept. 4, 1923.

1,467,243

UNITED STATES PATENT OFFICE.

WILLIAM J. FITZGERALD, OF BELOIT, WISCONSIN.

ROAD-MAKING MACHINE.

Application filed August 30, 1920. Serial No. 406,965.

*To all whom it may concern:*

Be it known that I, WILLIAM J. FITZGERALD, a citizen of the United States, residing at Beloit, county of Rock, and State of Wisconsin, have invented certain new and useful Improvements in Road-Making Machines, of which the following is a specification.

My invention relates to road making machines and more specifically to an improved machine for laying roads of concrete or asphalt.

One of the objects of my invention is to provide a machine that will handle the concrete as dumped in front of the machine from the mixer or in wheel barrow lots with practically no preliminary hand leveling.

Another object is to provide a machine which will lay a curb monolithic with the pavement.

Another object is to finish the pavement to the correct curvature by guiding the tool used to smooth it rather than by the use of a strike board or other implement extending entirely across the pavement.

Another object is to provide power means for driving the leveling and smoothing mechanisms.

Further objects and advantages of my invention will become apparent as the description proceeds.

In the accompanying drawings, Figure 1 is a front elevation of a machine constructed according to my invention. Fig. 2 is a view in section on the line 2—2 of Fig. 1 and Fig 3 is a view in section on the line 3—3 of Fig. 1 showing a side view of the carriage and the leveling and smoothing means. Fig. 4 is a rear view of the parts shown in Fig. 3. Fig. 5 is an enlarged front view of the ends of the machine illustrating the power connections and Fig. 6 is a plan view of one end of the machine showing the power installation and part of the transmission therefrom. Fig. 7 is a front view of the carriage and parts carried thereby, and Fig. 8 is a fragmentary plan view of the transmission on the carriage for moving the leveling means. Figs. 9 and 10 are detail views of one type of leveling tool which may be employed. Fig. 11 is an enlarged detail of control means in the transmission for reciprocating the carriage and Fig. 12 is a detail showing a rear elevation of the curb forming mold.

In the embodiment of my invention selected for illustration, a main framework is provided comprising chiefly end beams 10 in this instance formed of pairs of channels placed back to back and a main transverse beam formed of four channels placed in pairs back to back one pair 12 above the other pair 14.

Top piece 16 is also a channel and carries angle irons forming tracks 18 for the support and guidance of the carriage. The curvature of these tracks may be adjusted by springing them into the desired shape and clamping them in adjusted position by means of a series of bolts 20 engaging vertical slots 22 in the flanges of the top piece 16.

A transversely movable carriage indicated as an entirety by reference character 24 is supported and guided by four pairs of wheels 26 engaging both the upper and lower surfaces of the horizontal flanges 28 of the tracks 18 and is further guided by rollers 30 pivoted on vertical axes and engaging the edges of the tracks and other rollers 32 also on vertical axes and engaging the edges of the upper flanges of the lower pair of channels 14. It will be seen that the carriage is completely supported and guided for simple sliding motion along the tracks 18.

The framework of the carriage comprises four vertical members 34, in this instance of channel cross section, and horizontal cross pieces 36 and 38 uniting the lower ends of the vertical members to form a rigid structure. The upper ends of the vertical members are similarly united by pairs of transversely extending beams 40 carrying the wheels 26, and by overhanging beams 42 extending longitudinally of the roadway and forming a support for the swinging-leveler as hereinafter described. Vertical standards 44 slidably clamped on the carriage by means of bolts 46 passing through slots 48, support a non-rotatable tube 50 forming the smoothing tool. It will be seen that reciprocation of the carriage from side to side of the roadway will carry this tool across the roadway in contact with any material lying high enough to encounter it, smoothing the material and generating a surface of the same curvature as that of the tracks 18.

The tube or tool 50 has no tendency to move the material operated on longitudinally of the roadway. I have provided leveling means operating on either side of the tool to engage the material before the tool reaches it and move excess material above that necessary to fill in the roadway to the desired level, forward past the leading end of the tool. This means as illustrated comprises a pair of horizontal beams 52 of channel cross section pivoted at both ends to hanger frames 54 which are in turn pivoted at their upper ends to the ends of the longitudinal overhanging beams 42 of the carriage 24. The hanger frames preferably comprise each a pair of vertical tie rods 56 braced by cross braces 58 and supported for vertical adjustment with respect to the longitudinal beams 42 by means of nuts 60 threaded on their upper ends and engaging the opposite sides of clips 62 pivoted on horizontal pivots 64 on the beams 42.

The horizontal beams 52 carry each a series of rakes best illustrated in Figs. 3, 4, 9 and 10, each rake comprising a body pivoted on a horizontal pivot 66 passing through the downwardly directed flanges of the channel, and having a heel 68 adapted to engage the web of the channel to limit rotation of the device in one direction. A series of spikes 70 are attached to the vertical portion 72 of the body by any suitable means such as hook bolts 74 each operable to clamp its spike in place by means of a single nut 76.

Referring to Fig. 3 in which the direction of motion is toward the right and the heels 68 lie to the left of pintles 66, it will be apparent that oscillation of the horizontal beams 52 will force the spikes to drag through the material in their path during forward movement but that the spikes may swing and drag over the material when the beams are moved rearwardly.

I have provided a suitable power transmission for actuating the beams 52. As illustrated, this comprises links 78 pivotally connected as at 80 to the beams 52 and to rotary disks 82 carried by a shaft 84 supported in a frame 86 mounted for vertical sliding movement on a pair of vertical shafts 88 carried by the carriage 24. A gear wheel 90 keyed on the center of shaft 84 meshes with a gear 92 slidable on a square shaft 94 extending from side to side of the roadway so as to transmit power to the gear 92 as the carriage reciprocates. The slidable mounting of the frame 86 on the carriage 24 is provided to prevent distortion of the shaft 94 by the rise of the carriage as it travels back and forth over the curved tracks 18. I have provided means for supporting the frame 86 at a constant level in the nature of a pair of rollers 96 carried by the frame and riding on the channels 12 and 14 of the main beam. It will be seen that the carriage may move from side to side of the roadway and that frame 86 will be held at a constant level, permitting shaft 94 to transmit power continuously to the beams 52 without any change due to the rise of the carriage except an immaterial variation in the angle of the connecting links 78.

I have also provided means for reciprocating the entire carriage carrying the tool 50 and the oscillating rakes from side to side of the roadway. As illustrated this means comprises drums 98 and 100 at opposite ends of the frame, having a suitable cable 101 wound around them with its ends connected as at 102 (see Fig. 4) to the carriage 24. Suitable means for driving the drums in either direction comprises worms 104 and 106 on the shaft 108 of an engine 110, which worms engage worm wheels 112 and 114 on vertical axles carrying other worms 116 engaging worm wheels 118 to rotate conical friction elements 120 and 122 adapted to engage opposite ends of the drum 98, which has conical cups 124 at its ends for engagement with the friction elements. The worms 104 and 106 may be threaded in opposite directions so that the friction elements will be rotated in opposite directions. The drum may be supported on a shaft 126 journaled in bearings 128 carried by the frame, and be bodily moved by means of a suitable control lever 129 operating through link 131, rock shaft 133 and lever 135 carrying a finger engaging a groove 130 in a head 132 at the end of the shaft, to force the drum into engagement with either of the friction elements. The other end of the same engine shaft 108 carries a worm 134 rotating a wheel 136 on the end of shaft 94 to drive the leveling rakes, which may be controlled by means of hand lever 137, a link 139, rock shaft 141 and clutch collar 143.

The entire frame is mounted on tracks 139 laid in sections at either side of the pavement in advance of the machine, and may be advanced longitudinally of the roadway by any suitable means. I have illustrated sprockets 138 on stub shafts 140 having squared ends for engagement by a suitable crank and connected by chains 141 to large sprockets 142 rigid with the front wheels 144 supporting the frame. It will be seen that the frame may be readily moved along the tracks by workmen from either side of the roadway.

I prefer to form the curb monolythic with the body of the pavement. For this purpose molds are provided in the nature of boxes 145 carried at the front ends of the end beams of the frame, which boxes are kept filled with concrete. As the frame moves forward the concrete will flow out through the rear side of the box which has a discharge chute 146, the upper surface of which is shaped to conform to the desired contour of curb and a small portion of the roadway adjacent the curb. As the frame continues its forward movement the tube will smooth and level the central body of the concrete which will lie against and unite with the freshly laid strip delivered from the mold to form a monolithic structure including the main pavement and both curbs.

While I have illustrated and described in detail a preferred embodiment of my invention, it should be clearly understood that the disclosure is merely for purposes of illustration and that many modifications and variations will naturally occur to those skilled in the art. It will, for instance, be obvious that to operate on asphalt it is only necessary to substitute a heated roller pivoted on a horizontal axis for tool 50. I aim in the subjoined claims to cover all such legitimate variations and modifications.

I claim as my invention:

1. In a device of the class described, a framework extending from side to side of a roadway, a tool carried by said framework and adapted to oscillatory motion longitudinally of the roadway, means imparting said oscillatory motion to the tool, and means for moving said tool in contact with the road making material transversely of the roadway from one side to the other.

2. In a device of the class described, a framework extending from side to side of a roadway, a tool carried by said framework and adapted to oscillatory motion longitudinally of the roadway, means imparting said oscillatory motion to the tool, and means for imparting linear movement in a curved path to said tool transversely of the roadway from one side to the other.

3. In a device of the class described, a framework extending from side to side of a roadway, a tool carried by said framework and adapted to oscillatory motion longitudinally of the roadway, means imparting said oscillatory motion to the tool, means for imparting linear movement in a curved path to said tool transversely of the roadway from one side to the other, and means for varying the curvature of the path of said tool.

4. In a device of the class described, a framework extending from side to side of a roadway, a tool carried by said framework, means for imparting linear movement to said tool transversely of the roadway from one side to the other, and means located on both sides of said tool for moving material above a certain level longitudinally of the roadway.

5. In a device of the class described, a framework extending from side to side of a roadway, a tool carried by said framework, means for imparting a linear movement to said tool transversely of the roadway from one side to the other, and means located beside said tool and moving transversely therewith for moving material above a certain level longitudinally of the roadway.

6. In a device of the class described, a traveling framework, molds carried by said framework for molding the curb and a portion of the bed of a roadway upon movement of the framework, and a tool reciprocating transversely of the roadway on said framework adapted to finish the main portion of said roadway and in its operation overlapping the edges of the portions formed by said mold.

7. A machine for leveling and finishing a plastic material to form a roadway comprising a tool, means for moving said tool transversely of the roadway from side to side thereof, and means adjacent said tool and moving therewith for leveling the material before engagement with said tool.

8. In a device of the class described, a framework extending transversely of the roadway, tracks carried by said framework, a finishing tool slidably supported on said tracks and adapted to oscillatory motion longitudinally of the roadway, means imparting said oscillatory motion to the tool, and means for adjusting said tracks.

9. In a device of the class described, a framework extending transversely of the roadway, a carriage reciprocating from end to end of said framework, a tool on said carriage for finishing the surface of plastic material deposited to form the roadway and adapted to oscillatory motion of the roadway, means imparting said oscillatory motion to the tool, means for moving said carriage, and means for advancing said framework longitudinally of the roadway.

10. In a device of the class described, a framework extending from side to side of a roadway, a carriage slidable from end to end on said framework, power acutated elements reciprocating longitudinally of the roadway and supported on said carriage for moving material lying above the level of the finished road bed, and a finishing tool on said carriage for operating upon material allowed to remain by said longitudinally reciprocating means to finish the roadway.

11. In a device of the class described, a framework, tracks on said framework, a carriage on said tracks, operating mechanism on said carriage, and a transmission for delivering power to said operating mechanism, said transmission including a power receiving element movable horizontally with the carriage, and means for holding said power receiving element at a constant height regardless of variation of the height of the carriage.

12. In a device of the class described, a frame, curved tracks on said frame, a carriage on said tracks, operating mechanism on said carriage, and a power transmission to said operating mechanism including power receiving elements horizontally movable with said carriage, and means for maintaining said power receiving elements at a constant height.

13. In a device of the class described, a frame, tracks on said frame, having portions lying at different levels, a carriage on said tracks, an element on said carriage vertically slidable with respect thereto, operating mechanism on said carriage, power transmission from said frame to said element and from said element to said operating mechanism.

14. In a device of the class described, a frame, tracks having portions lying at different levels, a carriage on said tracks, an element on said carriage vertically slidable with respect thereto, means for maintaining said element at a constant height, a source of power, and transmission from said source to said element.

15. In a device of the class described, a frame, tracks on said frame having portions lying at various levels, a carriage on said tracks, operating mechanism on said carriage, a vertically slidable element on said carriage, means for maintaining said vertically slidable element at a constant height, a transmission shaft carried by said frame, and operatively connected with said element, and power transmission from said element to operating mechanism carried by the carriage.

16. In a device of the class described, a tool adapted to oscillatory motion longitudinally of the roadway, means imparting said oscillatory motion to the tool, means for reciprocating the tool from side to side of a roadway, leveling means movable from side to side of the roadway with the tool, and means for transmitting power to move said leveling means and tool from side to side and to actuate said leveling means.

17. In a device of the class described, a tool, means for moving the tool from side to side of the roadway, and leveling elements on both sides of the tool including rakes adapted to engage and level the material upon reciprocation in one direction, and to yield and become inoperative on movement in the opposite direction.

18. In a device of the class described, a framework extending from side to side of a roadway, leveling means power driven for movement longitudinally of the roadway, and means for feeding said leveling means transversely of the roadway from side to side on said frame.

19. In a device of the class described, reciprocatory rakes mounted to engage and move material lying in their path upon movement in one direction and to yield and pass over the material upon movement in the other direction, means for supporting said rakes over a road bed and for moving them transversely from side to side of the road bed to level the road making material.

20. In a device of the class described, reciprocatory rakes mounted to engage and move material lying in their path upon movement in one direction and to yield and pass over the material upon movement in the other direction, means for supporting said rakes over a road bed and for moving them transversely from side to side of the road bed to level the road making material, and means for transmitting power to reciprocate said rakes in any position.

In testimony whereof, I have hereunto set my hand.

WILLIAM J. FITZGERALD.